(12) United States Patent
Arthur

(10) Patent No.: US 7,090,374 B2
(45) Date of Patent: Aug. 15, 2006

(54) SWITCH FOR PORTABLE LIGHT

(76) Inventor: James David Arthur, 307 Fifteenth St. #5, Huntington Beach, CA (US) 92648

( * ) Notice: Subject to any disclaimer, the term of this patent is extended or adjusted under 35 U.S.C. 154(b) by 40 days.

(21) Appl. No.: 10/860,814

(22) Filed: Jun. 4, 2004

(65) Prior Publication Data
US 2005/0270773 A1    Dec. 8, 2005

(51) Int. Cl.
*F21V 23/04*    (2006.01)
(52) U.S. Cl. .............. 362/205; 200/1 B; 200/16 A; 200/60
(58) Field of Classification Search ........ 362/204, 362/205; 439/700, 500; 200/1 B, 16 A
See application file for complete search history.

(56) References Cited

U.S. PATENT DOCUMENTS

| | | | | |
|---|---|---|---|---|
| 2,518,039 A | * | 8/1950 | Goldman et al. | 362/183 |
| 2,897,345 A | * | 7/1959 | Meager et al. | 362/158 |
| 5,050,053 A | * | 9/1991 | McDermott | 362/204 |
| 5,593,222 A | * | 1/1997 | Maglica | 362/157 |
| 6,227,678 B1 | * | 5/2001 | Yau | 362/205 |

* cited by examiner

*Primary Examiner*—Ali Alavi
*Assistant Examiner*—Hargobind S. Sawhney

(57) ABSTRACT

An electrical switch comprising a helical spring, progressively compressed onto concentric annular contacts, provides a mechanism for operating a portable light or other devices, and for engaging multiple modes of operation of said device(s), for example a portable electronic flashlight.

9 Claims, 2 Drawing Sheets

SWITCH FOR PORTABLE LIGHT

FIELD OF THE INVENTION

This invention relates to electrical switches, and more particularly to switches controlling the operation of electronic flashlights.

DESCRIPTION OF THE RELATED ART

Contemporary small, portable lights or flashlights most commonly use one spring and one fixed contact for connections to the cathode and anode of a dry cell battery, respectively. The spring in these units commonly presses into and connects with the cathode of the dry cell battery, and said spring's spring force is used to press the dry cell battery's anode into a second, fixed contact, inferior to the bulb assembly. Metallic straps or wires are used to connect these contacts sequentially to the flashlight's bulb and power switch, respectively providing means for conveying electrical power to the flashlight's bulb, and for interrupting that power to turn the light on and off. In the case of flashlights with metallic bodies the body itself may serve as part of the circuit, replacing one of the conductors. Examples of this scheme are ubiquitous in flashlights made by Ray-O-Vac, Duracell, Garrity, Mag Instruments, among others.

Switches commonly used in the above scheme include sliding switches, such as a thumb-activated slide mechanism on the outside of the flashlight body, and pushbutton switches, either mounted in the body of the flashlight, or at the tailcap. All of these switches require penetration of the flashlight body, leaving gaps and openings through which water can enter and ruin the flashlight. Slide switches in particular are vulnerable to leakage. Further, while rubber domes with round rubber gasket skirts have been developed to cover pushbutton switches, providing some measure of water resistance, the result falls short of full water-tightness.

Other flashlights of contemporary design, such as the Energizer Waterproof flashlight model WP250WB-E, comprising a plastic body and a twist-on head, incorporate a "twist-on" switch. Said switch is operated by rotating the flashlight's head, clockwise turning the flashlight on, and counterclockwise to turn the flashlight off. Such switches have the great advantage of being entirely inside the flashlight's body, with water-tightness ensured by o-ring seals that seal the flashlight's head to its body. Water-tightness can be achieved at depths exceeding 100 meters of water. This switch comprises a rigidly mounted contact in the head assembly which, when the head is operated, is pressed into contact with the anode of a dry cell installed beneath it. Said switch, while effective in a conventional incandescent flashlight, does not provide means for controlling a multiplicity of modes for a more flexible, more capable electronic flashlight.

SUMMARY OF THE INVENTION

The advent of light emitting diodes (LEDs) has resulted in a new array of lighting products with capabilities unavailable in older, incandescent-based products. The instant invention discloses an electrical switch suitable for controlling the operation of a more advanced flashlight, especially one with multiple modes.

The preferred embodiment teaches how a spring—such as a helical spring fashioned of steel, stainless steel, copper alloy, brass, or other suitable metal or alloy, with or without chromium or other protective plating—can be combined with a suitable array of contacts to produce a multi-position shorting switch that is inexpensive, durable, and reliable. Said switch can be readily fabricated on one side of a printed circuit board, allowing it to operate circuitry assembled on the opposite side of same. Furthermore, said switch can be contained within the protective environment of the flashlight housing, facilitating construction of waterproof flashlights.

Additionally, the instant invention provides for contacting an electrode of a dry cell, thus combining an additional function without additional cost, reducing parts count, and reducing the number of interconnection points in the flashlight's electrical circuit. Reliability is accordingly increased.

DESCRIPTION OF THE PREFERRED EMBODIMENTS

Figure 1:
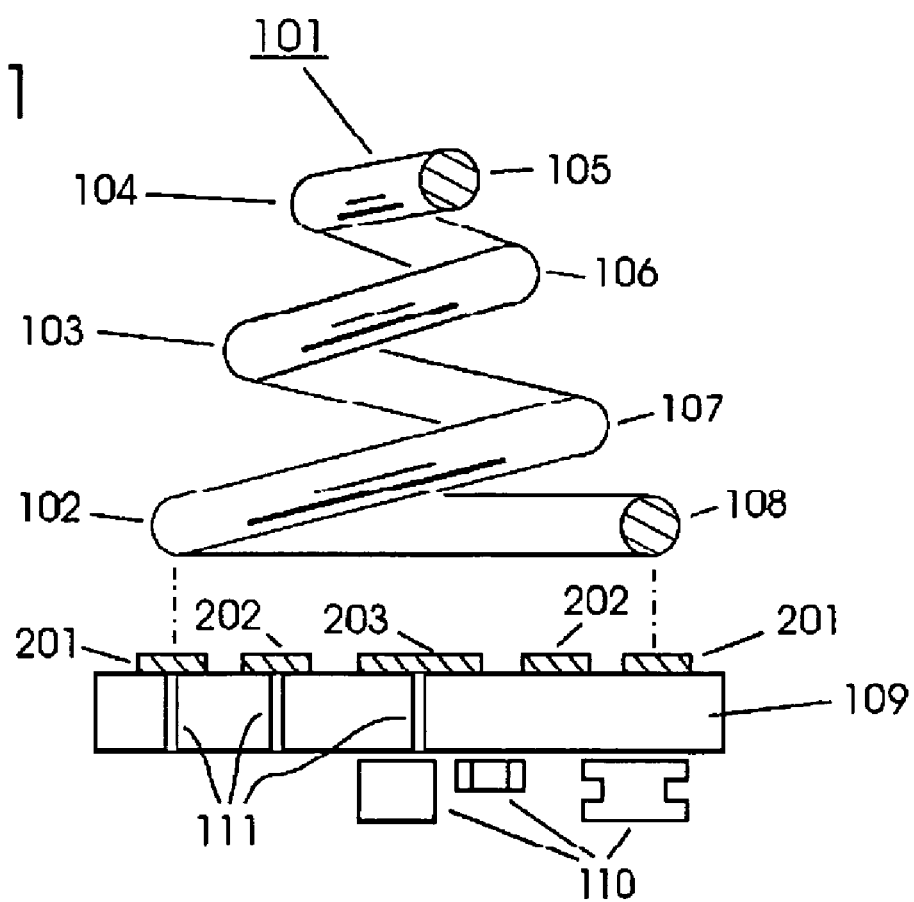
FIG. 1 depicts a cut-away view of the invention.

FIG. 1 depicts one preferred embodiment of the invention. A helical spring 101 made of a suitable electrically conductive material such as (but not limited to) steel, stainless steel, copper alloy, brass, or other suitable metal or alloy, with or without chromium or other protective plating, possessing coils 102–108, is positioned over concentric annular contacts 201–203. Said contacts 201–203 may be conductors laminated to a printed circuit board. 109. Connections 111 connect contacts 201–203 to circuitry 110.

Figure 2:
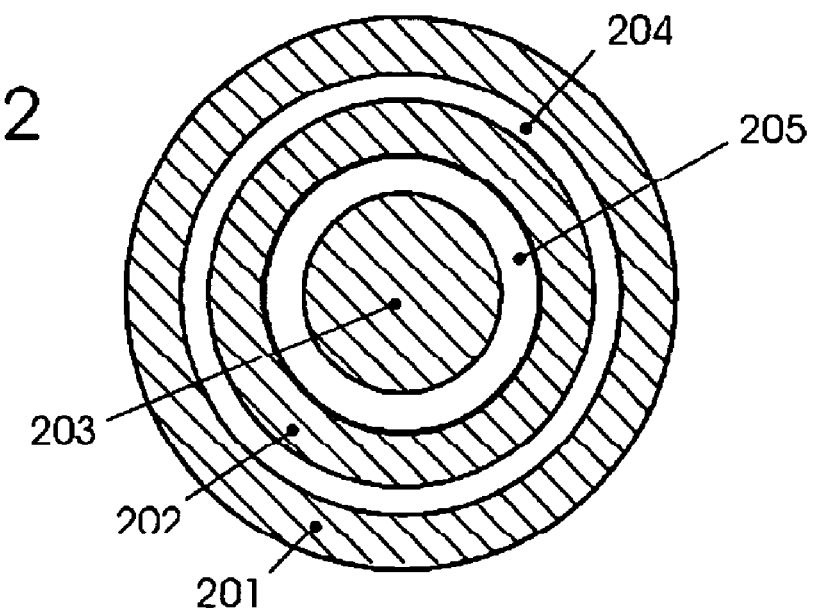
FIG. 2 is a top-view of the contact assembly.

FIG. 2 is a top-view of contacts 201–203, showing said contacts as well as insulating gaps 204–205. Gaps 204–205 serve to electrically isolate contacts 201–203 from each other until such time as the invention is activated. Contacts 201–203 may be supported by an insulating substrate, such as a fiberglass printed circuit board. Depiction of connections from contacts 201–203 to external circuitry has been omitted for clarity, but should be obvious to those skilled in the art.

OPERATION OF THE INVENTION

Figures 3A, 3B, 3C:
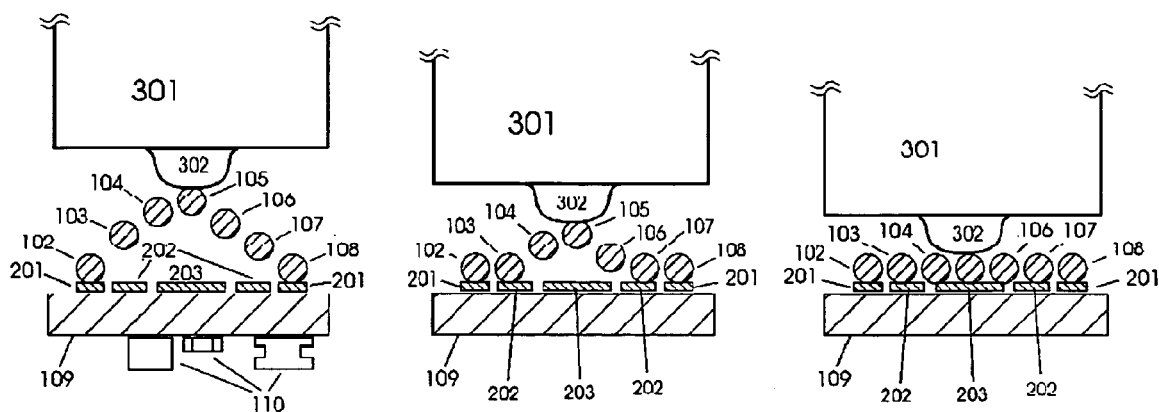
FIGS. 3a–c are cut-away views of the invention in various stages of operation.

FIG. 3a depicts a first state in which dry cell 301 has been positioned so that its anode 302 has just begun to touch coil 105 of spring 101. Spring 101's coils 102–108 are therefore only slightly compressed, none sufficiently to be advanced into contacts 202 or 203. In this first state, spring 101 is in electrical and mechanical contact with contact 201. This creates a first circuit, connecting battery anode 302 with contact 201 via spring 101. In this first state contacts 202 and 203 are open circuits.

FIG. 3b depicts a second state in which dry cell 301 is applying an additional compressing force to spring 101, as would happen, for example, if the entire switch assembly comprising 101–108 and 201–205 were squeezed partially together with dry cell 301. Said compression of spring 101 forces coils 103 and 107 into contact with contact 202, creating a second circuit. Said second circuit electrically connects battery anode 302 with contacts 201–202 via spring 101.

FIG. 3c depicts a third condition in which dry cell 301 has advanced sufficient distance to fully compress spring 101. Coils 103 and 107 are pressed into mechanical and electrical contact with contact 202, and coils 104–106 are forced into contact with contact 203, creating a third state. In this third state spring 101 electrically connects battery anode 302 to all of the contacts 201–203.

In brief, this preferred embodiment of the invention yields a single-pole, three-position shorting switch that can simultaneously provide connection to a battery. This switch can be used wherever a shorting single-pole multiple-position switch is desired, such as for controlling the brightness level or other operating mode of an electronic flashlight.

Although one preferred embodiment of the invention has been described, numerous embodiments in the spirit of the present invention will be apparent to those skilled in the art. For example, more or fewer than the three contacts 201–203 depicted in FIG. 2 may be used, adapting the invention to circumstances needing more or fewer switch positions. If an initial open circuit condition is desired, annular contact 201 may be omitted, or the space between spring 101 and dry cell 301 may be increased until the two do not initially touch. FIG. 3 depicts the invention being operated by the anode 302 of a dry cell 301, however the invention can be operated equally well by either electrode of a dry cell, or by an external mechanical plunger if desired. A helical spring 101 has been shown and is preferred for cost, simplicity, and performance, but a cantilevered lever arm or a metallic "snap" dome may be substituted to perform the same function. The contacts 201–203 need not be of annular configuration, but may take other shapes, such as concentric rings with finger-like projections that interleave in gaps 204–205 with similar projections from the opposing contact, pie-shaped wedges, among other shapes. Lastly, contacts 201–203 need not be flat, but can contained raised structures such as solder bumps, or other conductive bumps or contact areas designed to raise the contact force, lowering contact resistance. Bare metal "jumper" wires, positioned at various radii and oriented 90 degrees to spring coils 201–203 are another such alternative contact structure. All of these alternatives flow from and are anticipated in the practice of the instant invention.

I claim:

1. A switch comprising
(a) an electrically conductive helical spring comprising:
   a first coil of a first diameter,
   a plurality of coils of successively smaller diameters formed at successively increasing distances above said first coil
   and a final coil of a final diameter, and
(b) a plurality of electrical contacts arranged substantially within a first circle possessing a diameter substantially the same as said first diameter of said first coil, and;
(c) said plurality of electrical contacts being disposed so as to be facing and sharing a common center axis with said first coil of said spring, such that compressing said spring will bring said plurality of coils and said final coil progressively into electrical contact with said plurality of electrical contacts, electrically connecting said plurality of electrical contacts to said spring, and progressively connecting said plurality of contacts to each other,
whereby a single-pole, multiple-throw shorting-type electrical switch is created that progressively short-circuits said plurality of electrical contacts.

2. The apparatus of claim 1, wherein said switch is electrically connected to electronic circuitry means for controlling the modes of operation of an electronic flashlight.

3. The apparatus of claim 2, wherein said plurality of electrical contacts comprises a series of concentric annular rings surrounding a final, circular contact.

4. The apparatus of claim 3, wherein said plurality of electrical contacts are fabricated on and supported by a printed circuit board.

5. The apparatus of claim 2, wherein said final coil of said helical spring abuts and thereby provides mechanical and electrical contact with a power-source means.

6. The apparatus of claim 5, wherein said power-sourse means comprises a dry-cell battery.

7. The apparatus of claim 2, wherein at least a first contact of said plurality of electrical contacts is disposed so as to abut and electrically contact said first coil of said conductive helical spring regardless of the state of compression of said conductive helical spring,
whereby a first electrical circuit path is created connecting said spring and said first contact even absent compression of said conductive helical spring.

8. The apparatus of claim 7, where said first electrical circuit path comprises
(a) contact of said final coil with a battery means, and
(b) said conductive helical spring, and
(c) contact of said conductive helical spring with said first contact, and
(d) an electrical connection of said first contact with said electronic circuitry means,
whereby power may be supplied to said electronic circuitry means through said first electrical circuit path even absent compression of said conductive helical spring.

9. A method for controlling the modes of an electronic flashlight, comprising:
(1) providing an electronic flashlight means comprising
   (a) a thread-bearing battery compartment means capable of housing a battery means, and
   (b) a threaded flashlight head means capable of being threaded onto said compartment means, and
(2) providing said flashlight head means with switch means comprising
   (a) an electrically conductive helical spring comprising:
      a first coil of a first diameter,
      a plurality of coils of successively smaller diameters formed at successively increasing distances above said first coil
      and a final coil of a final diameter, and
   (b) a plurality of electrical contacts arranged substantially within a first circle possessing a diameter substantially the same as said first diameter of said first coil, and
   (c) said plurality of electrical contacts being disposed so as to be facing and sharing a common center axis with said first coil of said spring, such that compressing said spring will bring said plurality of coils and said final coil progressively into electrical contact with said plurality of electrical contacts, electrically connecting said plurality of electrical contacts to said spring, and progressively connecting said plurality of contacts to each other, producing a plurality of control signals, and
   disposed with said final coil directed toward said battery means, and capable of producing a compressive force on said battery means disposed within said battery compartment means, and
(3) providing said flashlight head means with electronic circuitry means responsive to said plurality of control signals, for controlling a plurality of modes of said flashlight means, and
(4) providing said electronic circuitry means with electrical connections to said electrical contacts,
whereby twisting said flashlight head means onto said battery compartment means operates said switch means, thereby supplying said plurality of control signals to said electronic circuitry means, thereby controlling said flashlight's plurality of modes.

* * * * *